Figure 1:
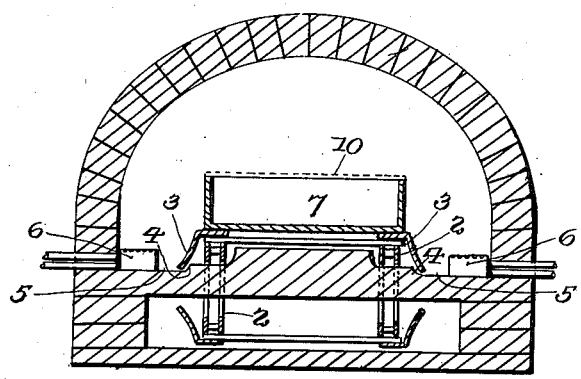

R. W. MUMFORD.
PROCESS OF MAKING DECOLORIZING CARBON.
APPLICATION FILED JAN. 15, 1918.

1,287,592.

Patented Dec. 10, 191
2 SHEETS—SHEET 1.

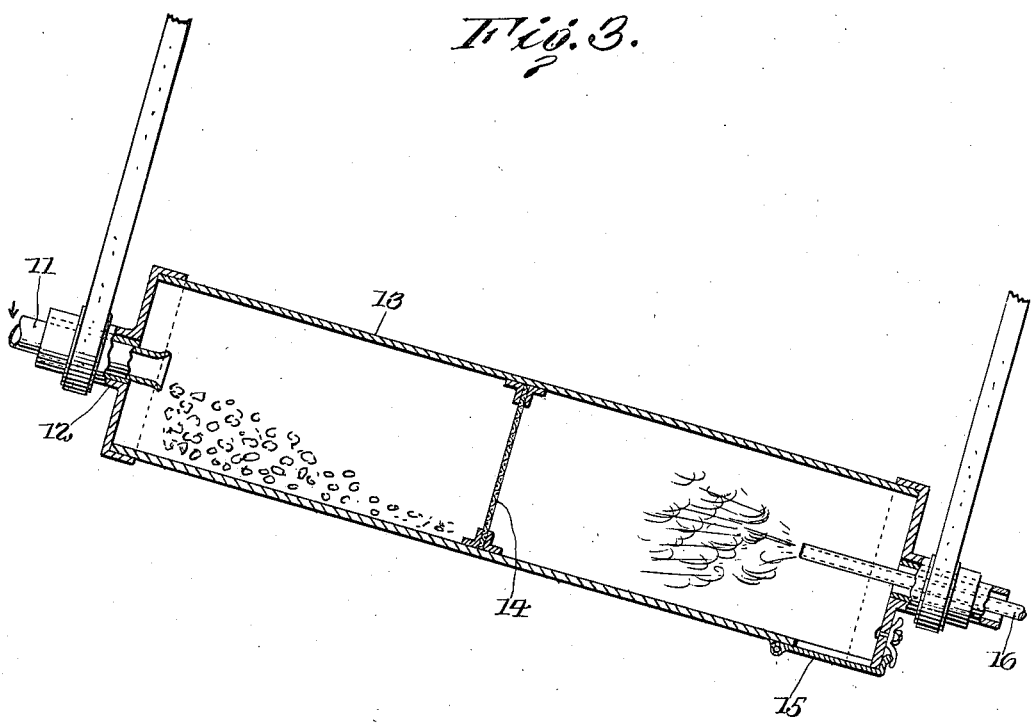

UNITED STATES PATENT OFFICE.

RUSSELL WILLIAM MUMFORD, OF NEW YORK, N. Y., ASSIGNOR TO REFINING PRODUCTS CORPORATION, OF WILMINGTON, DELAWARE, A CORPORATION OF DELAWARE.

PROCESS OF MAKING DECOLORIZING CARBON.

1,287,592.　　　Specification of Letters Patent.　　Patented Dec. 10, 1918.

Application filed January 15, 1918. Serial No. 211,979.

*To all whom it may concern:*

Be it known that I, RUSSELL WILLIAM MUMFORD, a citizen of the United States, residing at New York, in the county of New York and State of New York, have invented certain new and useful Improvements in Processes of Making Decolorizing Carbons, of which the following is a specification.

This invention relates to processes of making decolorizing carbons; and it comprises a method of making decolorizing carbons of a high degree of efficiency from various carbonaceous and vegetable materials such as sawdust, peat, lignite, woody residues from the manufacture of dextrose by acid, etc., wherein such a material is exposed to radiated heat such exposure being in flat thin layers, shielded from active circulation of gases, such radiated heat being produced within a suitable chamber by what is known as "surface combustion" therein; that is by combustion of gases in or on a refractory surface by means of approximately the right amount of air or oxygen required for such combustion; all as more fully hereinafter set forth and as claimed.

Vegetable carbon of the nature of charcoal has, as is well known, a certain degree of decolorizing power, but this power is too limited to warrant its use for most technical purposes; the purposes for which boneblack is employed. The reason why the carbon of charcoal is, relatively, inactive is not known. It is perhaps due to the kind of carbon or perhaps to the lack of active surface area. Whatever the reason, the fact exists. Of recent years, however, various kinds of preparations of charred materials known under the general trade name of "decolorizing carbons," having a more or less efficient decolorizing power have come into use; partly for the purposes for which boneblack is used and partly for purposes to which boneblack cannot be adapted. As a rule they are fine powders and are not used in filters, as is boneblack, but are directly stirred into the liquids to be purified, being subsequently removed by settling or filterpressing. Used in this manner they are more or less efficient in removing color, but generally do not give bright liquids; or, in other words, they do not remove the fine floating or suspended matter to which turbidity is due; often indeed, because of their fineness, rather contributing to its amount. A subsequent treatment with kieselguhr, or something of like finely porous nature, is often necessary to remove turbidity, both that originally present and that due to the decolorizing carbon itself.

These decolorizing carbons of a high degree of decolorizing activity are expensive to make by the processes now in use and are consequently rather costly. The expense is partly due to the complicated processes used, and the amount of heat required and partly because of the small yields of the final product. It is the object of the present invention to provide a cheap, simple and ready process giving material of high decolorizing power in abundant yield.

Any vegetable tissue, such as woody material, peat, etc., is of course a complicated cellular structure with cell walls of microscopic dimensions; these cell walls in the aggregate offering an enormous surface area for a small weight of material. In charring wood to make charcoal, the final product is not so porous as the original material; it being, of course, usually the effort to make charcoal as dense as possible. In charring wood, and other carbonaceous materials, the temperature goes up slowly until the moisture is removed, and then suddenly rises. This is supposed to be due to the fact that the breaking down of the wood in charring, after the moisture is driven off, is a heat-evolving phenomenon. In charring, the first action is the evolution of various gases, vapors, creosotes, tars, etc., and these in turn break down again with formation of more carbon; that is there are produced what may be called primary carbon and secondary carbon. Because of the rapidity with which the temperature rises the secondary carbon is deposited in the mass itself; the natural pores and cells of the material become more or less choked with secondary carbon. When so choked or plugged up, whether because the secondary carbon is not active or whether because the active area is lessened, the product (which is ordinary charcoal) is, as stated, of little activity for decolorizing purposes. Two main processes are in use for making charcoal; the retort process in which the wood is heated in closed containers by outside heat and the kiln process in which the temperature is kept up by allowing a slow flow of air through the mass of wood. In both the retort process and the kiln process the temperature at the time of charring is higher than is, apparently, warranted by the amount of heat supplied to the mass.

Sawdust, macerated peat and many other carbonaceous materials when in a comminuted state are bad conductors of heat and when trying to carbonize these materials in large quantities in retorts of large size, the parts nearest to the retort walls carbonize much quicker than the parts in the interior of the mass, so that an exterior carbon shell is formed around the interior or core of uncarbonized material. This carbon shell is an even worse conductor of heat than the original material and retards further propagation of heat to the core. It is difficult to secure even carbonization of the whole charge, and if the heating be pushed to give higher wall temperatures, the exterior layers of the material first charred are apt to waste away, reducing the yield.

In the manufacture of decolorizing carbons from granular vegetable materials, charring is in retorts which are usually heated as quickly as possible to as high a temperature as possible; and it is usual to blow in superheated products of combustion containing water vapor and carbon dioxid or superheated steam. Both steam and carbon dioxid, at these temperatures, are active oxidants for carbon; and both cause wasting away and small yields.

In the present invention I rearrange charring conditions so, that I can produce a highly active carbon with no uneven or merely partial carbonization, of the vegetable or carbonaceous material, and so, that all the fuel heat employed is applied in the most efficacious and direct manner to the material to be carbonized, that there is no sudden production of high temperature with the resultant deposition of secondary carbon in the material to be carbonized, and that large quantities of material can be carbonized under conditions permitting of commercially practicable yields without undue waste of the final material produced.

By rearranging charring conditions so as to keep controlled temperatures, it is possible to heat the mass slowly, uniformly, and progressively, at first extricating the volatile products of carbonization and getting rid of them, and then completing the charring by the application of a high temperature. It is my aim to carry the temperature finally to a point above 800° C. but to do this slowly, uniformly and gradually without a sudden passage from around 100° C. (the temperature at which the water vapor is expelled) to above 800°. To this end, I char my vegetable or carbonaceous materials in relatively thin or shallow layers in metal trays. By charring in thin layers there can be no great differences in temperatures between different portions of the material, and the uniform penetration of the heat through the whole material is facilitated, permitting the gradual raising of the temperature throughout the whole mass, without any sudden rapid changes in temperatures taking place as happens in retorts.

But with the material in shallow layers in metal trays it is necessary to provide special methods of heating. If the heating is done by open flame of the ordinary type in proximity to the material it will simply burn away. Flame and fire gases as they are produced in the ordinary type of furnace carry an excess of oxygen and furthermore draft conditions cause a relatively violent agitation within the furnace chamber so that the flame gases inevitably gain access to the material to be charred. In order to heat the materials in the way desired in the present invention with the use of ordinary firing means, the trays containing the material have to be more or less securely covered, so as to prevent the flame gases gaining direct access to the vegetable material to be carbonized. Covering the trays, however, means on the one hand the retention of the volatile products, tar, resins, creosotes, etc., longer in proximity to the charring material, and on the other hand unless the cover be sealed, does not preclude outside gases entering and carrying oxygen into the mass.

I therefore find, that it is much better when charring the material in thin or shallow layers in metal trays to provide special means of heating. The special means of heating which I employ is what is known as "surface combustion" the passage of air and combustible gas in about the corresponding amounts (without the excess of air always used in ordinary combustion) through porous brick or tile in such a manner that they unite and burn only on and in the face of the tile. Instead of using porous brick or tile, masses of granular material may be employed. As long as the rate of feed of the air-gas mixture to the face of the porous material is faster than the rate of backward propagation of ignition the combustion will be confined to the surface opposite the surface of introduction of the mixture. The gases produced by surface combustion are intensely hot, being free of the cooling influence of the diluting extra air usually present and are not, comparatively, highly oxidizing in their character. By placing the trays on the sole or hearth of a reverberatory chamber provided with surface combustion means, the intensely hot products of combustion ascend at once to the arch, heating the arch and furnishing heat downward by radiation. In so doing, even without considering the gases and vapors coming from the charring material there is what may be termed a blanket or layer of gases of less temperature between the charring carbonaceous material and the very hot gases in the arch. I may cover over the trays with a thin loose metal cover so as to prevent foreign matter or impurities falling into the carbon, but when using surface combustion in a reverberatory chamber this is hardly worth while. The trays may be arranged to move progressively through a long tunnel-like chamber by the use of any suitable type of conveyer. This not only gives a more economical operation, but it has the great advantage that the time of exposure to heat at each temperature between, say, from 100° and the end point of above 800° C., is under absolute control. It is of course easy to heat different portions of the tunnel-like heating chamber to fairly definite temperatures with the aid of surface combustion burners located at various points along its length, and to regulate positively the speed of travel of trays on a conveyer going through the heating chamber.

As a raw material I may use almost any vegetable material, or such like materials as peat, brown coal, etc., which for the sake of convenience may also be called vegetable materials, and because of the way in which heating is effected I am not restricted to the production of very fine powders, such as are yielded by most of the methods of making decolorizing carbon in closed retorts.

I can on the other hand produce comparatively coarse granular carbon which not only has a high degree of efficiency but because of its size does not produce turbidity in the liquid to be purified, while on the other hand, because of its porosity it has an absorbing action on the very fine solids in a state of suspension or quasi-solution, to which most permanent turbidity in liquids is due. In other words such coarse material unites the functions of the ordinary decolorizing carbons and of the kieselguhr or the like which are often used in conjunction with them for the purpose of clarification. Ordinary sawdust from pine or hard woods may be employed as a raw material but it may be desirable to clean out the pores of the sawdust as much as is practicable prior to the carbonization as this facilitates extrication of the volatile products and thereby aids in preventing deposition of secondary carbon. To this end, the sawdust may first be treated with any suitable extracting means capable of removing a part of the matter present. A very useful material for the present purposes is the coarse, highly porous residues left after certain processes of making sugar by treating wood with sulfuric acid or the like. After the action of the acid, a certain amount of the woody fiber is left behind in a highly porous condition. These highly porous materials may be advantageously treated with a solution of milk of lime and monocalcium phosphate added successively or simultaneously; thereby producing insoluble phosphates. For many purposes this improves the activity of the carbon.

It is often advantageous to mix with other raw materials a certain amount of carbohydrates soluble in water or acted on by it, such as starch, inulin, etc. Such a material on drying puffs up and becomes porous. For example, the waste of vegetable ivory (ivory nut) when ground into a powder and mixed with a solution of molasses or sugar to form a doughlike paste will give a good product. Brown coal, or lignite, mixed with molasses or starch also gives a good material. A mixture of brown coal and peat is also desirable as giving good products. For example, equal amounts of finely macerated peat and pulverized coal, advantageously brown coal, may be worked into a doughlike mass with water and from 1 to 3 per cent. of starch. Such a mixture gives a good yield of material of high efficiency. Good materials may be made from mixtures of peat and pulverized coal in equal proportions. Other mixtures may be made containing only 25 per cent. of pulverized coal or with as much as 60 per cent. of pulverized coal. Instead of using starch or sugar in these mixtures a solution of monocalcium phosphate may be worked in followed by milk of lime, producing gelatinous tricalcium phosphate in the mixture. Cork dust with admixture of animal colloid matter, such as a solution of glue, may be used, or rice and corn ground with the admixture of an emulsion of fine magnesium carbonate. The presence of a mineral spacing agent in the mixture is advantageous in charring as spacing and isolating the carbonaceous particles from each other. Different mineral matters may be used for this purpose, and may be subsequently removed from the product by shifting, levigation, etc. Various carbonates and oxids, of not too readily reducible nature, may be used for this purpose, being finally extracted with acids. I find that the best of these mineral spacing agents is dolomite; magnesium limestone. At about 250° C., dolomite begins to evolve carbon dioxid slowly and this action keeps on up to about 600° C. or higher. The contained magnesium carbonate first gives up its carbon dioxid and then the calcium carbonate in turn furnishes carbon dioxid. The carbon dioxid in its evolution not only checks sudden heating but it has the further advantage that it is taken up in the pores of the material and then as the temperatures goes up it reacts with the carbon by the well known "water gas reaction," oxidizing the carbon. In other words, it is taken up by the pores of the material and later, when the temperature is higher, reacts with the carbon present, tending to clear out any secondary carbon which may be deposited in the pores. After the material is made, the bulk of the lime and magnesia may be removed by sedimentation and any residue finally extracted with a little acid. I do not usually employ calcium carbonate as it does not tend to furnish carbon dioxid to any extent until the temperature becomes fairly high and at this high temperature there is a sudden evolution of gas. Its action is too destructive. Instead of using dolomite I may employ a little manganese dioxid. This gives a slow evolution of oxygen throughout a wide range of temperatures and has the same pore-clearing effect as the carbon dioxid.

It is usually necessary to dry the material and for this purpose the hot waste gases going from the charring operation may be advantageously employed.

Figure 2:
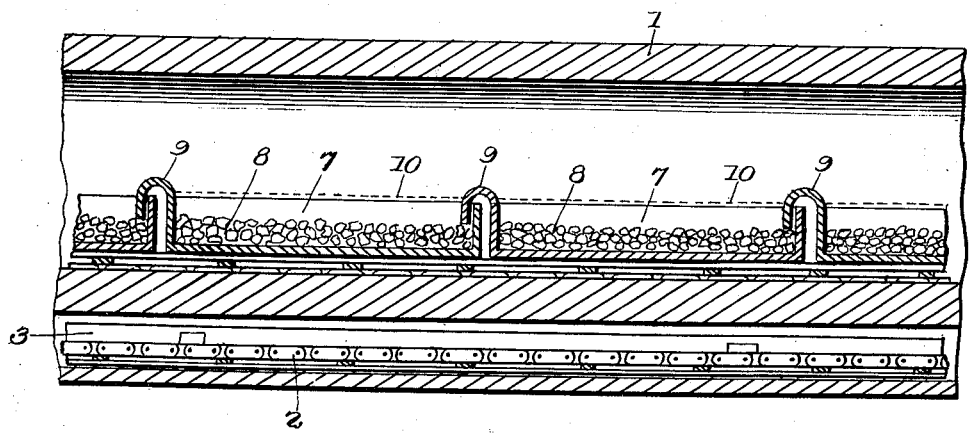

In the accompanying illustration I have shown, more or less diagrammatically and fragmentarily apparatus adapted for use in the present process. In the showing, Figure 1 is a transverse vertical section through a surface combustion heating chamber showing a pan in position;

Fig. 2 is a fragmental longitudinal view showing a series of pans in position on a carrier and hooked together; and Fig. 3 is a fragmentary central vertical section of a drier.

In this showing, element 1 is an arch of brick or any other suitable material forming part of a tunnel-like heating chamber of any desired length. At its floor it may be provided with carrier 2 having flange 3 overlapping wall 4 and making an approximate joint therewith. Between this wall and the main wall of the chamber is a gutter-like depression 5 within which are located a plurality of surface combustion burners, indicated diagrammatically as 6. Within the pan 7 is a layer of material to be carbonized 8. In the showing of Fig. 2 the pans are shown as each provided with a yoke member 9 linking adjacent pans together and permitting the whole assemblage to be pulled through the tunnel-like chamber as a train if so desired. The pans may be provided with a thin metal cover shown in dotted lines as 10. But this is not ordinarily necessary. In use the burners 5 along the length of the chamber are so adjusted as to give a regulated increase in temperature along such length. The hot gases ascend from the burners to the roof of the arch and there form a hot layer through which heat radiates down into the pan. The vapors and gases from the charring material rise upward and join this layer. The combustion in the chamber is mainly in the burners and there is not a violent surging, whirling mass of vapors and gases gaining access to the material being heated. After the material has been finished at the desired temperature, say above 800° C., it is dumped into water to cool it and the mineral matter, if such has been employed, is removed by sedimentation, and if necessary with the further use of a suitable acid to remove the last traces of any mineral matter present.

The carbon is then thoroughly dried in a rotary hot tube under the influence of the dry excess gases from the carbonizing furnace, or dry steam as shown in Fig. 3. In this showing element 11 is a stationary tube communicating with a source of supply of wet carbon to be dried. Revolving on the stationary tube is a tubular extension 12 of a rotating drum 13 provided with suitable journals (not shown). At or about the middle of this drum may advantageously be a screen 14 for holding back clumps or aggregates. At the lower end of the drum, which is set somewhat inclined, is a door 15 for removing dried carbon. Into this lower end hot waste gases from the carbonating furnace may be introduced at 16. In lieu of using the waste gases from the carbonization, I may use superheated steam (dry steam) or any other convenient heating gases or vapors.

The final product is more or less coarse grained material (this depending on the initial material) having open pores and a texture which is substantially the same as the original cellular texture of the material under treatment. It is a very efficient decolorant for solutions of sugar, glucose, glue, milk sugar, also vegetable and mineral oils, glycerin, etc., and its action is not dependent on any particular acid or alkaline reaction of the solution to be treated. In use it not only removes coloring matters very effectually but also gives bright liquids by taking up the substances causing turbidity. It does not itself contribute to turbidity.

What I claim is:—

1. The process of producing decolorizing carbon which comprises uniformly charring "carbonaceous" matter in thin shallow layers at progressively increasing temperatures through a range extending up to 800° C. and above; the conditions of heating being such as to preclude any sudden rise in temperature.

2. The process of producing decolorizing carbon which comprises uniformly charring vegetable matter in thin shallow layers contained in metal trays at progressively increasing temperatures through a range extending up to 800° C. and above; the conditions of heating being such as to preclude any sudden rise in temperature.

3. The process of producing decolorizing carbon which comprises uniformly charring comminuted carbonaceous matter in thin shallow layers contained in metal trays at progressively increasing temperatures through a range extending above 800° C. under conditions of direct and reverberating heat as created in surface combustion furnace, the heating being such as to preclude any sudden rise in temperature.

4. The process of producing decolorizing carbon which comprises charring comminuted vegetable matter in thin shallow layers in the presence of admixed mineral matter capable of absorbing heat, at progressively increasing temperatures through a range extending above 800° C.; the conditions of heating being such as to preclude any sudden rise in temperature.

5. The process of producing decolorizing carbon which comprises charring in metal trays, a doughlike mass of moist comminuted vegetable matter in thin shallow layers, in the presence of admixed pulverized mineral matter capable of absorbing heat, at progressively increasing temperatures through a range extending above 800° C., the conditions of heating being such as to preclude any sudden rise in temperature.

6. The process of producing decolorizing carbon which comprises uniformly charring comminuted carbonaceous matter in thin shallow layers in the presence of admixed mineral matter capable of absorbing heat and of evolving gases at progressively increasing temperatures through a range extending above 800° C.; the conditions of heating being such as to preclude any sudden rise in temperature.

7. The process of producing decolorizing carbon which comprises uniformly charring in metal trays a doughlike mass of moist comminuted carbonaceous matter in thin shallow layers, said mass containing admixed pulverized mineral matter capable of absorbing heat and of evolving gases at progressively increasing temperatures through a range extending above 800° C., the conditions of heating being such as to preclude any sudden rise in temperature.

8. The process of producing decolorizing carbon which comprises uniformly charring in metal trays, thin shallow layers of a doughlike mass of thoroughly moistened comminuted carbonaceous matter containing admixed pulverized mineral matter capable of absorbing heat and of evolving gases at progressively increasing temperatures through a range extending above 800° C. under the conditions of heating furnished by surface combustion furnaces, the mode of heating being such as to preclude any sudden rise in temperature, dumping the carbonized product into water under exclusion of air, removing the mineral matter by sedimentation and thoroughly drying the carbon in a rotary tube under the influence of heat and the excess gases of the carbonizing furnace.

9. The process of producing decolorizing carbon which comprises uniformly charring comminuted moist vegetable matter in thin shallow layers in the presence of admixed moist inorganic matter capable of absorbing water and retaining same with some persistency up to relatively high temperatures, continuing heating the mixture at progressively increasing temperatures through a range extending above 800° C., the condition of heating being such as to preclude any sudden rise in temperature.

10. The process of producing decolorizing carbon which comprises uniformly charring moist comminuted carbonaceous matter in thin shallow layers in the presence of admixed moist finely comminuted organic matter capable of absorbing water and retaining same with some persistency, continuing heating the mixture at progressively increasing temperatures through a range extending above 800° C., the condition of heating being such as to preclude any sudden rise in temperature.

11. The process of producing decolorizing carbon which comprises uniformly charring in metal trays, thin shallow layers of a doughlike mass of moist comminuted vegetable matter with admixture of moist pulverized mineral matter, such mineral matter being capable of absorbing water and retaining same with some persistency up to relatively high temperatures, continuing heating the mixture at progressively increasing temperatures through a range extending above 800° C. under the conditions of heating furnished by surface combustion, the mode of heating being such as to preclude any sudden rise in temperature, dumping the carbonized product into water under exclusion of air, removing the mineral matter by sedimentation and thoroughly drying the carbon in a rotary tube under the influence of heat and the excess gases of the carbonizing furnace.

12. The process of producing decolorizing carbon which comprises uniformly charring in metal trays thin shallow layers of a doughlike mass of moist comminuted carbonaceous matter with admixture of other moist finely divided organic matter, such other organic matter being capable of absorbing water and retaining same with some persistency, continuing heating the mixture at progressively increasing temperatures through a range extending above 800° C. under the conditions of heating furnished by surface combustion, the mode of heating being such as to preclude any sudden rise in temperature, dumping the carbonized product into water under exclusion of air, removing the mineral matter by sedimentation and thoroughly drying the carbon in a heated rotary tube under the influence of dry steam.

13. The process of producing decolorizing carbon which comprises uniformly charring moist comminuted carbonaceous matter in thin shallow layers in admixture with pulverized dolomitic limestone at progressively increasing temperatures through a range extending above 800° C.; the conditions of heating being such as to preclude any sudden rise in temperature.

14. The process of producing decolorizing carbon which comprises uniformly charring in metal trays thin layers of moist comminuted vegetable matter in admixture with granular dolomitic limestone, at progressively increasing temperatures through a range extending above 800° C. under surface combustion heating, the heating conditions being such as to preclude any sudden rise in temperature, dumping the carbonized material into water, removing the mineral matter and thoroughly drying the carbon in a rotary hot tube under the influence of hot gases.

15. The process of producing decolorizing carbon which comprises uniformly charring in metal trays thin layers of a mixture of moist comminuted vegetable matter with the products of reaction of milk of lime and a solution of monocalcium phosphate at progressively increasing temperatures through a range extending above 800° C. under surface combustion heating conditions, the heating being such as to preclude any sudden rise in temperature, removing the mineral matter by sedimentation and thoroughly drying the carbon in a rotary hot tube under the influence of dry steam.

16. The process of producing decolorizing carbon which comprises slowly and uniformly charring in metal trays in thin shallow layers a doughlike mass of finely macerated peat containing an admixture of milk of lime at progressively increasing temperatures through a range extending above 800° C. under surface combustion heating conditions, the heating being such as to preclude any sudden rise in temperature, dumping the carbonized material into water under exclusion of air, sedimenting the mineral matter, and thoroughly drying the carbon in a rotary heated drum under the influence of hot gases.

17. The process of producing decolorizing carbon which comprises slowly and uniformly heating fine macerated peat containing admixed finely divided vegetable colloid matter in thin shallow layers in metal trays at progressively increasing temperatures through a range extending above 800° C., the conditions of heating being such as to preclude any sudden rise in temperature.

18. The process of producing decolorizing carbon which comprises slowly and uniformly heating fine macerated peat containing admixed vegetable colloid matter in thin shallow layers in metal trays at progressively increasing temperatures through a range extending above 800° C. under surface combustion heating conditions, the heating conditions being such as to preclude any sudden rise in temperature, dumping the carbonized material into water under exclusion of air and thoroughly drying the carbon in a rotary heated drum under the unfluence of dry steam.

19. The process of producing decolorizing carbon which comprises slowly and uniformly heating a doughlike mixture of finely macerated peat, pulverized brown coal, and starch in thin shallow layers in metal trays at progressively increasing temperatures through a range extending above 800° C. the conditions of heating being such as to preclude any sudden rise in temperature.

20. The process of producing decolorizing carbon which comprises slowly and uniformly heating in metal trays in thin layers a doughlike mixture of fine macerated peat, moist granular brown coal and starch, at progressively increasing temperatures through a range extending above 800° C. by surface combustion heating, the heating conditions being such as to preclude any sudden rise in temperature, dumping the carbonized material into water under exclusion of air, and then thoroughly drying the carbon in a rotary heated drum by the waste gases of the carbonizing furnace.

In testimony whereof, I affix my signature hereto.

RUSSELL WILLIAM MUMFORD.